United States Patent [19]

Oetjen et al.

[11] 4,162,628

[45] Jul. 31, 1979

[54] LOAD CELL

[75] Inventors: Georg Oetjen; David L. Eck, both of Columbus, Ohio

[73] Assignee: Reliance Electric Company, Cleveland, Ohio

[21] Appl. No.: 863,797

[22] Filed: Dec. 23, 1977

[51] Int. Cl.² ............................................. G01L 5/12
[52] U.S. Cl. ................................................. 73/141 A
[58] Field of Search ............... 73/88.5 R, 141 A, 767, 73/855; 338/5

[56] References Cited

U.S. PATENT DOCUMENTS

| | | | |
|---|---|---|---|
| 2,487,595 | 11/1949 | Ruge | 73/141 A |
| 3,036,283 | 5/1962 | Singdale et al. | 73/141 A |
| 3,196,676 | 7/1965 | Pieu | 73/141 A |
| 3,448,424 | 6/1969 | Laimins | 73/141 A |
| 3,513,431 | 5/1970 | Kovacs | 73/141 A X |
| 3,636,760 | 1/1972 | Shoberg | 73/141 A |
| 3,736,795 | 6/1973 | Andersson | 73/141 A |
| 3,960,013 | 6/1976 | Ormond | 73/141 A |
| 4,066,140 | 1/1978 | Conley | 73/141 A X |
| 4,089,036 | 5/1978 | Geronime | 73/141 A X |

Primary Examiner—Charles Gorenstein
Attorney, Agent, or Firm—Wood, Herron & Evans

[57] ABSTRACT

A load cell having a hollow central measuring body, a base section for supporting the measuring body, and a load receiving section for receiving a load at substantially one point and transmitting the load substantially uniformly to the hollow central measuring body. The load receiving section includes an extension extending into the hollow portion of said measuring body to reduce the deflection of said load receiving section when load is applied to the load cell. The base section includes a reduced section to cause the base section to deflect under load to compensate for deflection of the load receiving section under load.

18 Claims, 12 Drawing Figures

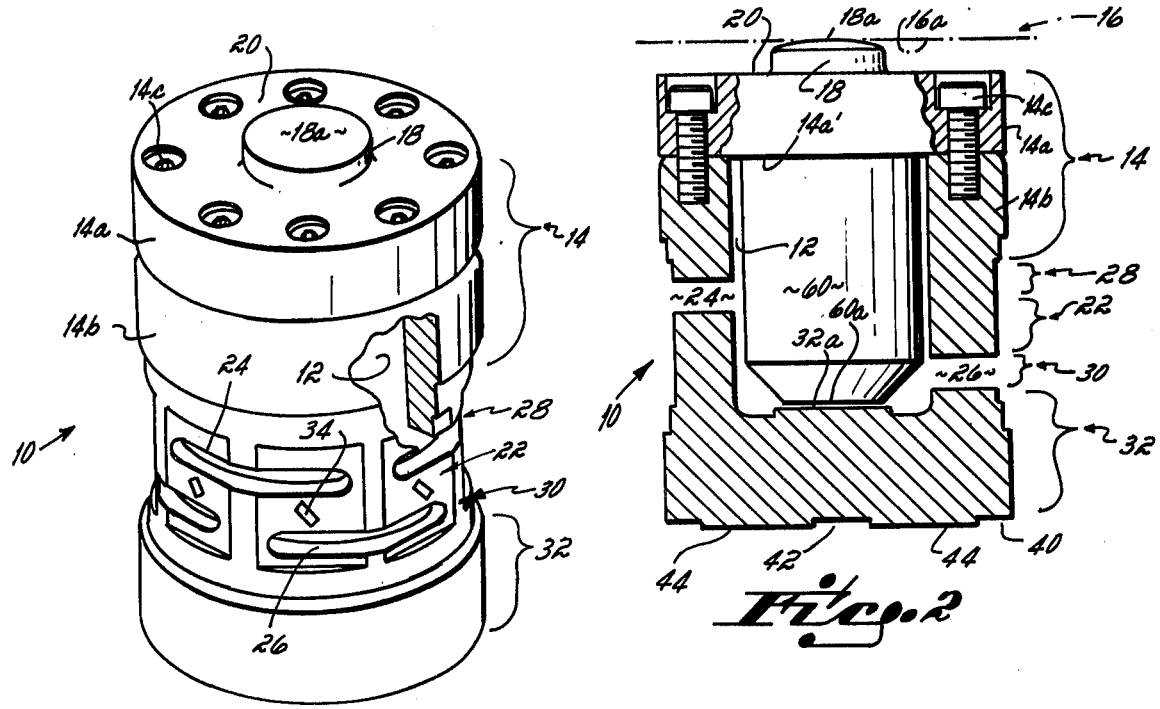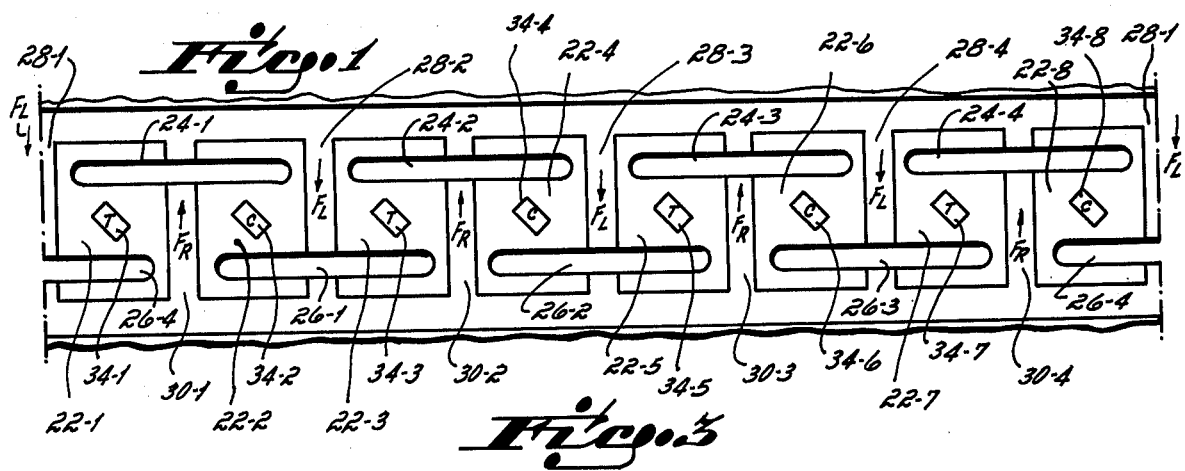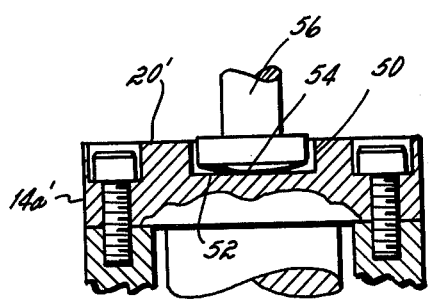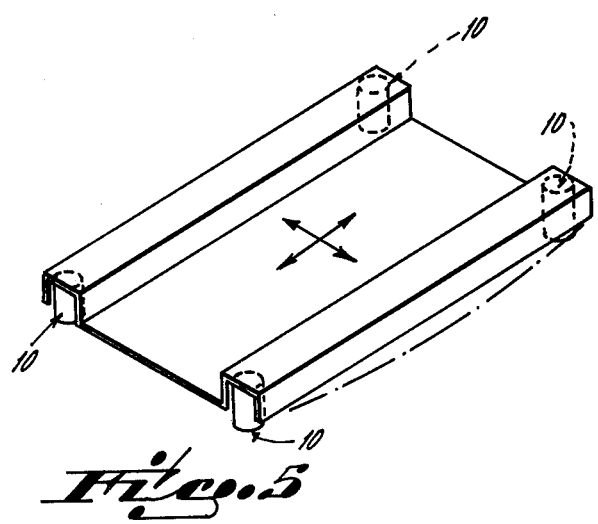

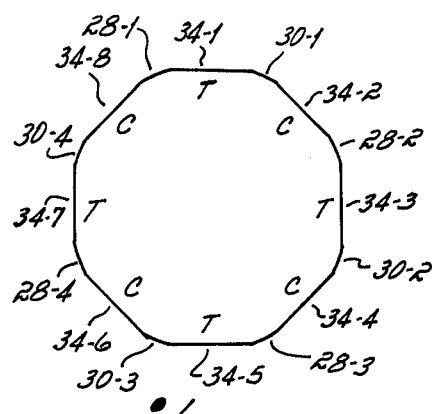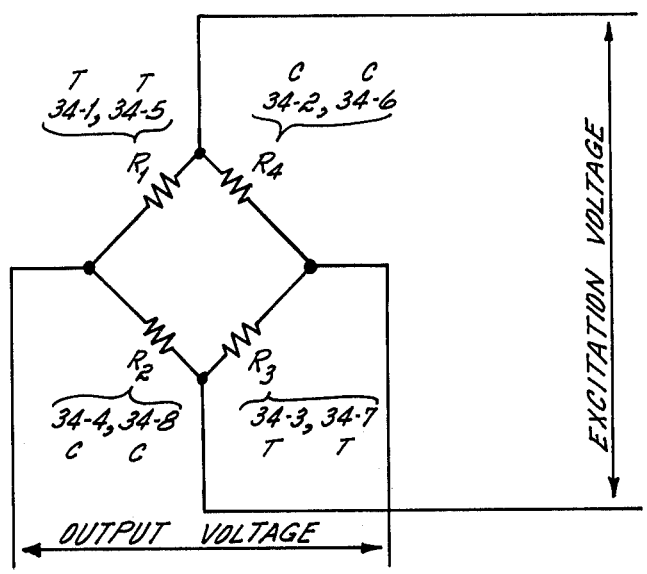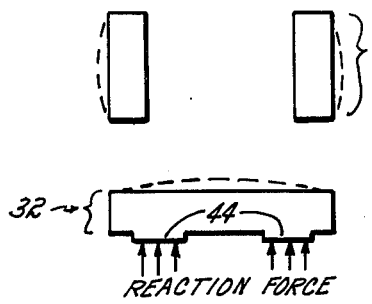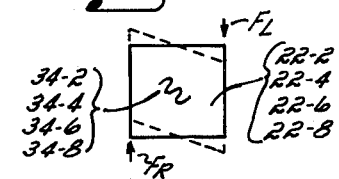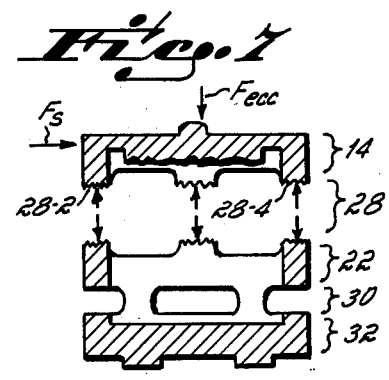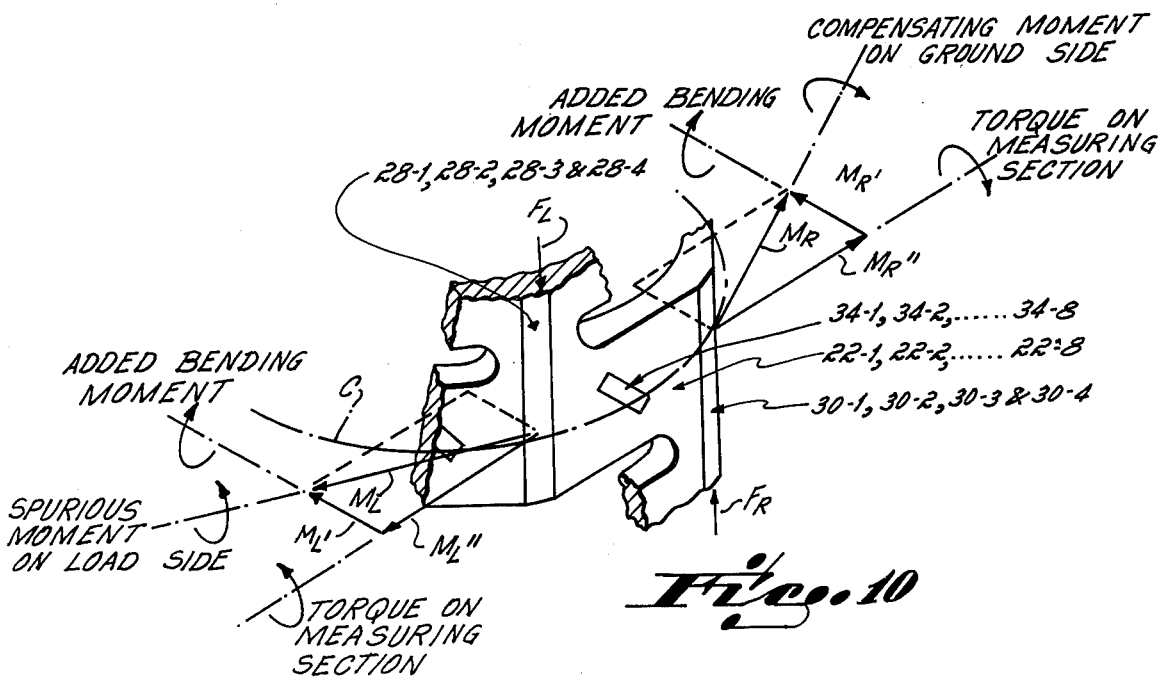

LOAD CELL

This invention relates to load cells, and more particularly to a load cell which is adapted to be point-loaded.

PRIOR ART

The load cell described in U.S. Pat. No. 3,513,431 granted to S. Kovacs on May 19, 1970 is arranged so that the measuring body as well as the force-transmitting upper part and the lower part (base) transmitting the reaction forces in complete cylindrical symmetry by providing an upper shoulder for receiving the load and a lower base for receiving the reactive force.

However, for most weighing operations it is desirable to apply the load to the load cell at substantially a single point. When it is attempted to apply the load to the load cell described in U.S. Pat. No. 3,513,431 at substantially a single point, deflections of the structures prevent the application of the load and reactive forces to measuring body in complete cylindrical symmetry.

SUMMARY OF THE INVENTION

In accordance with one aspect of this invention the upper shoulder of Kovacs is completely eliminated, and in its place a structurally and functionally different element is utilized, namely, a unitary structure to receive the load forces at substantially a single point. This structure is provided with a column that extends into and may substantially fill the internal cavity in the measuring body. The column greatly stiffens or strengthens the load receiving structure so it deflects much less under load, thereby minimizing undesirable, or spurious, strains in the measuring section caused by deflection-induced moments applied to the measuring section by the load receiving structure. Consequently, measurement errors introduced by the extraneous and undesirable strains in the measuring body are reduced. In addition a reduced section is formed on the outer side of the base, e.g., a groove, or channel cut into the base member, so that it deflects with the application of load to the cell in such a manner that compensating, neutralizing or counterbalancing forces are applied to the measuring body to counterbalance the residual extraneous strains produced by the deflections of the load receiving structure.

A load cell is a transducer which converts a force applied to it in a measuring direction to an electrical output correlated to the magnitude of the applied force. Load cells of the type with respect to which this invention possesses a relatively high degree of utility are commonly used in weighing devices designed to measure the weight of massive bodies such as trucks, railroad cars and the like. Typically, a vehicle scale includes a generally flat platform onto which the vehicle is driven for weighing purposes. Underlying the platform at the four corners thereof are load cells. Each of the load cells measures the force applied to it by its associated portion of the platform; collectively, the load cells produce a measurement correlated to the total weight of the vehicle resting on it.

Since a scale platform is necessarily large by reason of the need to accommodate a vehicle, it is subject to substantial variations in its dimensions due to temperature changes. Such temperature changes cannot normally be avoided since the scale is usually located outdoors and unprotected from normal environmental temperature changes. In addition, and to minimize cost, a scale platform typically is not so massive and stiff that it does not normally undergo deflection when loaded.

As a consequence of temperature-induced dimensional changes and deflections which a scale platform undergoes in normal use, it has been found necessary in the past to utilize special load cell mounting arrangements and the like to discriminate against the effects, namely, lateral and eccentric loading, occasioned by platform dimensional change and deflection. These auxiliary mounting arrangements have typically been designed to facilitate point loading of the load cell such that it becomes insensitive to non-axial load components, i.e., side loads and/or eccentrically applied loads, which necessarily result from deflection and dimensional changes of the scale platform encountered in normal use. It is also customary to provide bumpers or checks for the scale platform to accommodate horizontal forces due to vehicular braking on the platform. These auxiliary devices not only add to the cost of the weighing apparatus, but have not been entirely effective in achieving the objective of isolating the load cell from eccentric and/or side loading encountered in use.

Accordingly, it has been an objective of this invention to provide a load cell which is capable of being point-loaded by a scale platform which undergoes deflection and dimensional variation in normal use, and yet exhibits output characteristics which are linear with respect to the axial load components applied in a generally vertical, or measuring, direction. This objective has been achieved by providing a load cell which includes a central tubular measuring section which is effectively divided into plural circumferential measuring elements by upper and lower sets of load and reaction transmitting columns which are circumferentially offset from each other to induce shear in the measuring elements as a consequence of an applied load. The upper, or load-transmitting, columns extend downwardly from a load-receiving plate having centrally located means to which the load can be applied at a single point. The lower, or reaction, columns extend upwardly from a ground-supported base. The base is provided, along its lower surface, with downwardly projecting ridge means which are effective to apply to the measuring elements, via the lower set of reaction columns, compensating moments which are equal and opposite to moments applied to the measuring elements by the upper set of load columns as a consequence of deflection of the load receiving plate when subjected to a point load.

By virtue of the foregoing arrangement, when a load is applied to the load cell in an axial, or measuring direction, the measuring elements are effectively subjected primarily to shear strains proportional to the vertical force applied to the cell. By orienting strain gages on the surfaces of the measuring elements such that they measure normal strains, compressive and tensile, resulting from the load-induced shear strains, an electrical output is obtainable which is correlated to the axial force applied at a single point to the load cell by a scale platform or the like. The response characteristic of the load cell is linear relative to loading applied in the vertical, axial, measuring direction notwithstanding that the load receiving section deflects when point loaded and applies moments to the measuring elements.

In accordance with certain additional principles of this invention, the load cell is rendered relatively insensitive to loading applied in other than the measuring direction, that is, loading other than in a vertical, axial direction. Stated differently, the load cell discriminates against both lateral, or side, loading and eccentrically applied loads. This discrimination capability is achieved, in part, by providing at least 4n columns, where n is an integer, in both the upper, load column set and the lower, reaction column set. The columns of each set, by reason of being circumferentially staggered, produce 8n measuring elements, each of which is provided, as previously described, with a strain gage on its peripheral surface. By orienting the strain gages of diametrically opposed pairs of measuring elements such that they measure the same type of normal shear strain, and by further placing such diametrically opposed strain gage pairs in the same leg of a measuring bridge circuit, strains induced in the measuring elements due to side loads and/or eccentric loads are effectively cancelled, with the result that the load cell discriminates against both side and eccentric loads.

In accordance with a further objective of the invention, the load cell is designed such that damage to it due to overloads is avoided. This objective has been accomplished in accordance with certain additional principles of the invention by providing an overload column between the base and load-receiving section of the load cell. The axial length of the overload column is less than the distance between the base and load-receiving section by an amount equal to the deflection of the load-receiving section encountered under rated capacity conditions. Loads applied to the load-receiving section in excess of the rated capacity cause the bottom of the column to abut the base of the load cell. This results in excessive loads being applied mainly to the base via the overload column, bypassing the measuring elements of the tubular measuring section, thereby avoiding damage to the measuring section due to application of loads exceeding the rated capacity.

By dimensioning the overload column as wide as possible consistent with the internal dimensions of the tubular measuring section, and by forming it integral with the load-receiving section which has a tendency to deflect when point-loaded, a further advantage is achieved. Specifically, the load-receiving section is stiffened, minimizing deflection thereof when subjected to point-loading. This, in turn, minimizes the moments applied to the measuring elements by the load-transmitting columns. Minimization of these moments minimizes the moments which should be compensated, neutralized or cancelled by the compensating moments applied to the measuring section by the reaction columns, produced by reacting the load through the annular ridge projecting from the bottom surface of the base.

A still further objective of the invention has been to design a load cell which is easy to manufacture and assemble, and yet from a mechanical standpoint is effectively an integral unitary structure with low mechanical hysteresis. This objective has been accomplished in accordance with certain further principles of the invention by constructing the base, measuring section, and upper and lower sets of load and reaction transmitting columns as a physically unitary member with a central internal cavity which is closed at the bottom by the base, but open at the top to facilitate access to the interior thereof. A physically separable load-receiving cap closes the cavity at the top. Tensioned bolts, which are preloaded such that they remain under tensile stress under all load conditions contemplated in normal use, connect the cover to the remaining portion of the load cell. By preloading the bolt joint between the load-receiving cap and the other components of the load cell (which are physically integral), the cap and remaining load cell structure effectively function, from a mechanical standpoint, as an integral unitary structure with resultant low mechanical hysteresis.

These and other features, advantages and objectives of the invention will become more readily apparent from a detailed description thereof taken in conjunction with the drawings in which:

FIG. 1 is a perspective view, partially cut away, showing the load cell of this invention.

FIG. 2 is a vertical cross-sectional view through a reaction column and a load column.

FIG. 3 is a developed elevational view of the measuring section of the load cell showing the measuring elements which are subjected to shear forces when loaded.

FIG. 4 is a vertical cross-sectional view of the load-receiving portion of a modified form of the load cell utilizing a different point-loading arrangement.

FIG. 5 is a schematic perspective view of a platform scale with which the load cell of this invention is useful in weighing vehicles.

FIG. 6 is a schematic horizontal cross-sectional view through the measuring section of the load cell showing the alternating arrangement of adjacent strain gages oriented to measure the shear strain by compression or tension of the strain gages.

FIG. 7 is a schematic circuit diagram of a Wheatstone bridge showing the manner in which the strain gages are connected to discriminate against eccentric and side loads.

FIG. 8 is a schematic diagram showing the deflections due to the forces and moments applied to the load-receiving section, measuring section, and base section due to application of a load which is reacted through the base from a ground support on which the load cell rests.

FIG. 9a is a schematic elevational view showing the normal and deformed shapes of a load measuring element when subjected to shear forces induced by point-loading from an applied load, and the orientation of a strain gage thereon adapted to respond to tensile strain.

FIG. 9b is a schematic elevational view showing the normal and deformed shapes of a load measuring element when subjected to shear forces induced by point-loading from an applied load, and the orientation of a strain gage thereon adapted to respond to compressive strain.

FIG. 10 is a perspective view of a measuring element showing the moments applied thereto due to bending of the point-loaded load-receiving section, and the bending of the base section due to application of reactive forces to the projecting ridge defined by the relieved portions of the bottom surface of the base, and FIG. 11 is a schematic vertical cross-sectional view of the load cell, particularly the load-transmitting columns thereof, which is useful in understanding the manner in which the load cell discriminates against lateral and eccentric loading.

As is apparent from the figures, particularly FIGS. 1, 2 and 3, the load cell 10 of this invention, in one embodiment thereof, is generally cylindrical in shape and provided with a circular cross-section cavity formed in the interior thereof which is closed at its upper and lower ends. The load cell 10 has five principal functional sections. Starting at the top, these include a load-receiving section 14, a load-transmitting section 28, a measuring section 22, a reaction transmitting section 30 and a base 32.

The load-receiving section 14, at its upper extremity, is provided with means for applying to substantially a point of the load cell, a load from a member such as a scale platform or the like identified schematically by the reference numeral 16. In the embodiment shown in FIGS. 1 and 2, the load is applied to a button 18 which is integral with, and projects upwardly from, the load receiving section 14. The upper surface 18a of button 18 is convex, assuring substantial point contact with the undersurface 16a of the overlying scale platform 16 which in the illustrative case constitutes the load.

While the load receiving section 14 could conceivably by physically unitary in structure, in practice it has been found more convenient to make it as two physically separate elements in the form of a cap 14a and an underlying tubular section 14b. The cap 14a and tubular section 14b, which collectively constitute the load-receiving section 14, can then be secured together with bolts 14c. Bolts 14c are preloaded sufficiently in tension to insure that under all contemplated normal load conditions the bolts remain under some degree of tension, which in turn maintains in compression the confronting mating surfaces of the cap 14a and tubular section 14b. As such, and notwithstanding that the cap 14a is separable from the remaining tubular portion 14b of the load-receiving section 14, the cap and associated tubular section effectively function as a unitary structural element under contemplated load conditions in excess of rated capacity, thereby minimizing mechanical hysteresis. The utility of having the cap 14a separable from the tubular section 14b of the load-receiving section 14 is that it enables the internal cavity 12 to be readily formed.

Located in the central portion of the load cell 10 is the tubular measuring section 22 which includes eight measuring elements 22-1, 22-2, ..., 22-8 which are structurally identical and spaced at equal circumferential intervals as is apparent from the developed view of the measuring section 22 shown in FIG. 3. The measuring elements 22-1, 22-2, ..., 22-8 are equidistant from the axis of symmetry of the measuring section, which axis is parallel to the vertical, measuring direction of the load cell.

The measuring elements 22-1, 22-2, ..., 22-8 lie between an upper set of four substantially identically configured through slots 24-1, ..., 24-4 which are spaced at equal circumferential intervals around the load cell, and a lower set of equally spaced substantially identically configured circumferential through slots 26-1, ..., 26-4. The size and shape of the slots 24-1, ..., 24-4 may be substantially identical to that of slots 26-1, ..., 26-4; but need not necessarily be so. As is apparent from FIG. 3, the upper set of slots 24-1, ..., 24-4 and the lower set of slots 26-1, ..., 26-4 are staggered with respect to each other such that the centers of each of the upper and lower slots are vertically aligned with the spaces between the lower and upper slots, respectively. As a consequence of this slot configuration and spacing arrangement the measuring elements 22-1, ..., 22-8 are subjected to shear forces when a load is applied to button 18 of the load cell 10.

Specifically, each of the measuring elements 22-1, ..., 22-8 is subjected to a vertically downwardly directed component of the load indicated by the arrow designated $F_L$ and to an upwardly directed component of the reaction force indicated by the arrow designated $F_R$. The load force components $F_L$ are transmitted to the measuring elements 22-1, ..., 22-8 by a set of four equally circumferentially spaced load force transmitting columns 28-1, 28-2, 28-3 and 28-4 which are located in alignment with the spaces separating the upper slots 24-1, 24-2, 24-3 and 24-4. The load force transmitting columns 28-1, ..., 28-4 collectively constitute the load transmitting section 28 of the load cell 10 which is located between the tubular load receiving section 14 and the tubular measuring section 22. The reaction forces $F_R$ are transmitted to the measuring elements 22-1, ..., 22-8 by four equally circumferentially spaced reaction force transmitting columns 30-1, 30-2, 30-3 and 30-4 which are disposed in alignment with the spaces between the lower slots 26-1, ..., 26-4. Reaction force transmitting columns 30-1, ..., 30-4 collectively constitute the reaction force transmitting section 30 which is located between the tubular measuring section 22 and the base section 32 which rests on a ground support or the like when the load cell is in use.

The exterior of the measuring elements 22-1, 22-2, ..., 22-8, in the embodiment illustrated, are flat. This facilitates convenient bonding of strain gages 34-1, 34-2, ..., 34-8 to the measuring elements 22-1, 22-2, ..., 22-8. Strain gages 34-1, 34-3, 34-5 and 34-7 are oriented at 45° relative to the vertical, or measuring axis, of the load cell to respond to tensile strain when their respectively associated measuring elements 22-1, 22-3, 22-5 and 22-7 are subjected to shear under the action of shear-inducing load and reaction forces $F_L$ and $F_R$ described previously. Strain gages 34-2, 34-4, 34-6 and 34-8 are also oriented at 45° with respect to the measuring direction to respond to compressive strain in their associated measuring elements 22-2, 22-4, 22-6 and 22-8 when the latter are subjected to shear-inducing load and reaction forces $F_L$ and $F_R$. FIGS. 9a and 9b show, in exaggerated form, the deformation of measuring elements 22-1, 22-3, 22-5, 22-7 and 22-2, 22-4, 22-6 and 22-8, respectively, and their associated strain gages 34-1, 34-3, 34-5, 34-7 and 34-2, 34-4, 34-6 and 34-8, respectively, oriented to measure tensile and compressive strains, respectively, when the measuring elements are subjected to shear strain due to reaction forces $F_L$ and $F_R$.

An electrical Wheatstone bridge circuit is utilized to provide an electrical output voltage correlated to the combined shear strain induced in the measuring elements 22-1, 22-2, ..., 22-8 when the load cell 10 is subjected to a load applied at button 18. As shown in FIG. 7, the bridge circuit contains four legs $R_1$, $R_2$, $R_3$ and $R_4$. Strain gages 34-1 and 34-5, which are oriented to respond to tensile shear strain (FIG. 3) and located on diametrically opposed measuring elements 22-1 and 22-5 (FIG. 6), are connected in the same bridge leg $R_1$. Connected in bridge leg $R_3$, which is opposite to bridge leg $R_1$, are strain gages 34-3 and 34-7. Gages 34-3 and 34-7 are both oriented to respond to tensile shear strain (FIG. 3), and located in measuring elements 22-3 and 22-7, which are diametrically opposed (FIG. 6). Strain gages 34-4 and 34-8, which are oriented to measure compressive shear strain (FIG. 3), and located in diametrically opposed measuring elements 22-4 and 22-8 (FIG. 6), are connected in bridge leg $R_2$. Bridge leg $R_4$ contains strain gages 34-2 and 34-6 which are oriented to measure compressive shear strain (FIG. 3) in diametrically opposed measuring elements 22-2 and 22-6 (FIG. 6). With strain gages connected in the manner noted and with an excitation voltage applied as shown in FIG. 7, an output voltage is provided across the output terminals which is correlated to the combined shear strain induced in measuring elements 22-1, 22-2, ..., 22-8 by application of a load to button 18.

Alternatively, opposite strain gages could be located in opposite legs of the bridge to render the load cell insensitive to lateral and/or eccentric loads.

In operation, and assuming a point-load is applied vertically to the center of the button surface 18a, such that the load is symmetrical with respect to the measuring elements 22-1, 22-2, ..., 22-8, the measuring elements are each subjected to equal and opposite vertical shear forces $F_L$ and $R_R$ (FIG. 10). These forces produce the main shear strain in the measuring section to which the strain gages respond. In addition, and due to deflection of the load-receiving cap 14a under the action of the point load, the measuring elements 22-1, 22-2, ..., 22-8 are each subjected to a spurious moment $M_L$ transmitted by their respectively associated load columns 28-1, ..., 28-4. The vector of moment $M_L$ lies in a horizontal plane perpendicular to the measuring direction of the load cell at a vertical elevation such that the plane passes through the center of the measuring element 22-1. The vector of moment $M_L$ is directed tangentially relative to the circumference C of the measuring element 22-1 at a point centered relative to the load transmitting column 28-1. The moment $M_L$ may be resolved into two components, $M_L'$ and $M_L''$. Moment component $M_L'$ lies in the same plane as moment $M_L$, but is directed perpendicular to the flat outer surface of measuring element 22-1 to which the strain gage 34-1 is bonded.

To compensate for moment $M_L'$ induced in the measuring element 22-1 as a consequence of deflection of the load-receiving cap 14a when subjected to a point load, and thereby linearize the response of the load cell relative to the component of the load applied in the vertical measuring direction, an equal moment $M_R$ is applied to the measuring element 22-1. Moment $M_R$ is obtained by providing a reduced cross section in the base member 32 by, e.g., selectively relieving the bottom surface of the base around the outer periphery thereof as indicated by reference numeral 40, as well as by relieving the center as indicated by reference numeral 42 (FIG. 2). Relieved portions 40 and 42 in the bottom surface of the base 32 provide an annular ridge 44 which projects downwardly from the bottom surface of the base 32. When the load applied to the button 18 is reacted through the base section 32, a reaction force is applied in a vertically upward direction to the ridge 44. The reaction force so located and directed causes the base section 32 to deflect such that a compensating moment $M_R$ is applied to the measuring elements 22-1, 22-2, ..., 22-8 via reaction columns 30-1, 30-2, 30-3 and 30-4. Moment $M_R$, as shown in FIG. 10, lies in the plane of the moment $M_L$ induced by deflection of cap 14a when point loaded, and like moment $M_L$, moment $M_R$ is tangential to the circumference C of the load cell at a point centered with respect to the reaction column 30-1. The nature and extent of the ridge 44 formed in the bottom surface of the base section 32 is such that moment $M_R$ is equal in magnitude to moment $M_L$.

The moment $M_R$ may be similarily resolved into two components $M_R'$ and $M_R''$. The component $M_R'$ lies in the same plane as $M_L$ and $M_R$, but is directed perpendicular to the flat outer surface of the measuring element or section 22-1. The two bending moments $M_L'$ and $M_R'$ are in the same plane, are parallel, and are directed in the same direction and of substantially the same magnitude. However, they are at opposite ends of the measuring body 22-1 so they produce substantially equal and opposite strains at the center of this measuring element and thus tend to cancel or neutralize each other.

The components $M_L''$ and $M_R''$ are opposite and in line along the face of the measuring body 22-1 and thus apply a torque to the measuring body. For those measuring sections in which the strain gage measures the shear strain by being under tension, this torque adds to the strain and thus increases the response of these strain gages. For those measuring sections in which the strain gage measures the shear strain by being under compression, the torque subtracts from strain and thus decreases the response of these strain gages. However, all the strain gages are connected in a bridge network as described herein, which, in effect, adds the responses of all the strain gages so the effects of the torque applied to the various measuring sections are cancelled or eliminated. Thus, the ridge 44 enables the load cell 10 to be point-loaded, which is an extremely desirable load cell feature, and the load applied thereto to be measured free of errors due to nonlinearities introduced by extraneous bending moments applied to the measuring elements on which the strain gages are located.

The load cell of this invention discriminates against eccentric loading, such as by the application of a force $F_{ecc}$ which is offset from the axis of symmetry of the load cell which passes through the center of the load button 18 parallel to the vertical measuring direction, as well as side loads $F_S$ applied in a direction transverse to the vertical measuring direction of the load cell. With reference to FIG. 11, it is apparent that a side load $F_S$ applied in the direction shown will place load column 28-2 in tension and column 28-4 in compression. Referring now to FIG. 3, placemement of column 28-2 in tension will induce conditions of shear strain in measuring elements 22-2 and 22-3 while placement of column 28-4 in compression will produce conditions of shear strain in measuring elements 22-6 and 22-7. Since strain gages 34-2 and 34-6 are both in bridge leg $R_4$ (FIG. 7) and both oriented to measure compressive strain, the shear strain of measuring element 22-2 and the shear strain and measuring element 22-6, both of which are induced by the side load $F_S$, result in the production of changes in the resistance of strain gages 34-2 and 34-6 which are in equal and opposite directions, producing no net change in the resistance of bridge leg $R_4$. In similar fashion, no net change in resistance due to side load $F_S$ is produced in the resistance of bridge leg $R_3$. Specifically, strain gages 34-3 and 34-7, which are both oriented to measure tensile strain in associated measuring elements 22-3 and 22-7, are in the same bridge leg $R_3$. As such, the change in resistance of strain gage 34-3 which is in tension due to the side load $F_S$ is counteracted by the change in resistance of the strain gage 34-7 which is in compression due to side load $F_S$, producing no net change in resistance in bridge leg $R_3$.

The foregoing analysis applies to eccentric loads $F_{ecc}$.

Thus, by provision of four force transmitting columns, 28-1, 28-2, 28-3 and 28-4 (and four corresponding reaction columns 30-1, 30-2, 30-3 and 30-4) and by placement of the strain gages of diametrically opposed measuring elements in the same bridge leg, which strain gages of the diametrically opposed elements are both oriented to measure the same type of strain (either tensile or compressive), the load cell of this invention discriminates against both side loading and eccentric loading.

Alternatively, opposite strain gages could be located in opposite legs of the bridge to render the load cell insensitive to lateral and/or eccentric loads.

FIG. 8 depicts schematically the deflections due to the forces and moments applied to the load receiving section 14, measuring section 22 and base section 32 via the load transmitting columns and the reaction force transmitting columns when a load applied to a point on button 18 is reacted through the annular ridge 44 projecting from the bottom surface of the base 32. The deflection of the load receiving cap 14a when a point load is applied to button 18 is shown in exaggerated form as is the deflection of the base section 32 when the applied load is reacted through the projecting ridge 44. The resulting deflection of the measuring elements 22-1, . . . , 22-8 of the measuring section 22 as a consequence of the moments applied to it via load transmitting columns and reaction transmitting column is also shown in exaggerated form in FIG. 8.

To stiffen the load-receiving element and provide overload protection and avoid damage to the load cell if the applied load exceeds the rated capacity, a column 60 is located between the base 32 and the bottom surface of the cap 14a of the load receiving section 14. The length of the column 60 in the measuring direction, that is, in a direction parallel to the axis of symmetry of the measuring section 22, is less than the distance between the bottom surface 14a' of cap 14a and the upper internal surface 32a of the base section 32 by an amount corresponding to the deflection of the cap 14a when subjected to a load equal to the rated capacity. When loads exceeding the rated capacity are applied to the button 18, the bottom surface 60a of the column 60 abuts the upper internal surface 32a of the base section 32 at a loading point corresponding to the rated capacity. That portion of the load in excess of the rated capacity will be transmitted to the base 32 primarily via the column 60 rather than through the measuring section 22, preventing damage to the measuring section 22.

To minimize deflection of the cap 14a of the load receiving station 14 when point loaded at button 18, the overload prevention column 60 is formed integral with the cap 14a and designed to provide maximum diameter consistent with the size of the cavity 12. In this manner, the cap 14a, which tends to deflect when point loaded at button 18, is stiffened to reduce deflection under load conditions.

If single point load-receiving elements are used at both ends of the load cell, instead of a single unitary stiffening and overload prevention column 60, the column could be fabricated to two separate axially aligned columns. As far as overload prevention is concerned (vis-a-vis stiffening of cap 14a), a two-piece column is as effective as a one piece column since in either case when an overload occurs the axial clearance disappears and the overload is primarily transmitted directly from cap 14a to base 32. However, if it is desired to have the overload column also stiffen the cap 14a a unitary column integral with cap 14a provides greater stiffening for cap 14 than a two-piece column arranged such that its respective one-half length sections are integral with the cap 14a and base 32, and the normal clearance taken up during an overload located between the unattached confronting ends thereof.

The utility of the load cell of this invention can be illustrated by reference to FIG. 4. Specifically, FIG. 5 depicts a vehicle load scale supported at its four corners by four load cells. The scale platform is typically constructed of steel and is subject to variation in length (and width) in the direction of the arrows as a consequence of temperature variations. In addition, since it is not economically feasible to fabricate the scale platform with such stiffness that it does not bend under load, deflection of the scale platform in normal use can be expected as indicated by the phantom lines. These dimensional variations and deflection characteristics result in the course of normal use, in the application of side and eccentric loads to the load cell. The load cell of this invention, not only exhibits a linear response characteristic, but discriminates against such side and eccentric load conditions, providing accurate and reliable load measurements over a varying range of operating conditions.

An alternative arrangement for point-loading the load-receiving section 14 is shown in FIG. 4. Specifically, a recess 50 is provided in the center of the upper surface 20' of the cap 14a'. The recess 50 has a flat horizontal bottom surface 52 which cooperates with a spherical surface 54 at the lower end of a load pin 56 to which the load to be measured is applied from a suitable scale platform or the like. The combination of the flat bottom recess and the spherical surface of the pin assures point contact between the loaded pin and the load-receiving section 14a' regardless of the angulation of the pin with respect to the load cell.

What is claimed is:

1. A load cell comprising, in combination:
   a hollow central measuring column subject to strains to be measured,
   a base section for supporting said hollow central measuring column, and
   a load receiving section for receiving a load at substantially one point and transmitting the load substantially uniformly to said hollow central measuring column, said load receiving section including an extension extending into the hollow portion of said hollow central measuring column to reduce the deflection of said load receiving section when load is applied to the load cell.

2. A load cell comprising in combination:
   a central measuring section,
   a load receiving section for receiving a load at substantially one point and for transmitting the load substantially uniformly to the central measuring section,
   a base section for supporting said central measuring section, said base section having a reduced section to cause said base section to deflect under load to compensate for deflection of the load receiving section under load.

3. A load cell in accordance with claim 1, wherein the extension cooperates with the base section to form an overload stop to provide overload protection for the hollow central measuring column.

4. A load cell in accordance with claim 1 wherein the base section has a reduced section to cause said base section to deflect under load to compensate for deflection of the load receiving section under load.

5. A load cell in accordance with claim 4, wherein the hollow central measuring column comprises:
   (a) a cavity therein defining a tube having an axis of symmetry substantially parallel to a measuring direction, said tubular measuring column having at least 8n equally circumferentially spaced measuring elements, where n is an integer, each measuring element having a measuring surface on its exterior, (b) 4n equal circumferentially spaced open through slots in said tubular measuring column, said slots defining 4n load-transmitting columns for transmitting a load applied to said load-receiving section to one side of each of said measuring elements, (c) 4n equal circumferentially spaced lower through slots in said tubular measuring column, said lower slots each being centered in vertical alignment with a different one of said load-transmitting columns to establish 4n reaction force transmitting columns for transmitting a reaction from said base to the other side of each of said measuring elements, (d) said reaction and load forces applied to any given measuring element by said reaction and load-transmitting columns being oppositely directed placing said measuring elements in shear when said load-receiving section is point loaded.

6. The load cell of claim 1 wherein at least two of said sections are attached by fasteners having a tension preload which, for all applied loads below the rated capacity of said load cell, results in non-zero net tensile forces existing in all said fasteners.

7. The load cell of claim 1 wherein said hollow central measuring column includes at least 8n circumferentially spaced measuring elements, where n is an integer, each measuring element having a strain gage associated therewith, and an electrical bridge circuit having said strain gages connected therein, with each pair of diametrically oppositely located strain gages connected in the same bridge leg of said electrical bridge circuit.

8. The load cell of claim 1 wherein said measuring column has a central cavity, and said extension substantially fills said cavity leaving an annular space between the wall of said cavity and said extension.

9. The load cell of claim 1 wherein said hollow central measuring column includes at least 8n circumferentially spaced measuring elements, where n is an integer, each measuring element having a strain gage associated therewith, and an electrical bridge circuit having strain gages of alternate measuring elements in the same legs of said bridge.

10. The load cell of claim 5 further comprising:
strain gages associated with each measuring element, and an electrical bridge circuit having strain gages of alternate measuring elements in the same legs of said bridge.

11. The load cell of claim 1 wherein said hollow central measuring column includes at least 8n circumferentially spaced measuring elements, where n is an integer, each measuring element having a strain gage associated therewith, an electrical bridge circuit having a first plurality of gages which increase their respective responses if torque is applied to their respectively associated measuring elements, said first plurality of gages are in the same legs of one pair of opposite legs of the bridge, and a second plurality of gages which decrease their respective responses if torque is applied to their respectively associated measuring elements, said gages of said second plurality being in the same legs of the other pair of opposite legs of the bridge.

12. The load cell of claim 1 wherein said hollow central measuring column includes at least 8n circumferentially spaced measuring elements, where n is an integer, each measuring element having a strain gage associated therewith, and an electrical bridge circuit having said strain gages connected therein, with each pair of diametrically oppositely located strain gages divided between opposite legs of said electrical bridge circuit.

13. The load cell of claim 1 wherein said hollow central measuring column includes at least 8n circumferentially spaced measuring elements, where n is an integer, each measuring element having a strain gage associated therewith, and an electrical bridge circuit having strain gages of alternate measuring elements in opposite legs of said bridge.

14. The load cell of claim 5 further comprising:
strain gages associated with each measuring element, and an electrical bridge circuit having strain gages of alternate measuring elements in opposite legs of said bridge.

15. The load cell of claim 1 wherein said hollow central measuring column includes at least 8n circumferentially spaced measuring elements, where n is an integer, each measuring element having a strain gage associated therewith, an electrical bridge circuit having a first plurality of gages which increase their respective responses if torque is applied to their respectively associated measuring elements, said first plurality of gages are in opposite legs of one pair of opposite legs of the bridge, and a second plurality of gages which decrease their respective responses if torque is applied to their respectively associated measuring elements, said gages of said second plurality being in opposite legs of the other pair of opposite legs of the bridge.

16. A load cell comprising, in combination:
a hollow central measuring column subject to strains to be measured, a base section for supporting said hollow central measuring column and, a load receiving section for receiving a load and transmitting the load to said hollow central measuring column, said load receiving section including an extension extending into the hollow portion of said hollow central measuring column to reduce the deflection of said load receiving section when load is applied to the load cell.

17. A load cell comprising in combination:
a central measuring section, a load receiving section for receiving a load and for transmitting the load to the central measuring section, and a base section for supporting said central measuring section, said base section having a reduced section to cause said base section to deflect under load to compensate for deflection of the load receiving section under load.

18. A load cell in accordance with claim 16 wherein the base section has a reduced section to cause said base section to deflect under load to compensate for deflection of the load receiving section under load.

* * * * *